United States Patent [19]

Futcher et al.

[11] 4,347,281
[45] Aug. 31, 1982

[54] FOAM BOARD HAVING IMPROVED EVENNESS AND THE METHOD AND APPARATUS FOR ITS CONTINUOUS MANUFACTURE

[75] Inventors: Steven Futcher, Crumpsall; John J. Gardener, Bury; Victor F. Hodgson, Worsley, all of England

[73] Assignee: Imperial Chemical Industries Limited, London, England

[21] Appl. No.: 223,301

[22] Filed: Jan. 8, 1981

[30] Foreign Application Priority Data

Jan. 17, 1980 [GB] United Kingdom ................. 8001534

[51] Int. Cl.³ ............................................ B29D 27/04
[52] U.S. Cl. ................................. 428/318.4; 156/79; 156/550; 264/46.2; 264/101; 425/224; 425/817 C
[58] Field of Search ............. 264/DIG. 84, 46.2, 46.3, 264/101; 425/224, 817 C; 156/79, 550

[56] References Cited

U.S. PATENT DOCUMENTS

| 3,984,195 | 10/1976 | del Carpio .................. 264/DIG. 84 |
| 4,097,210 | 6/1978 | Romanillos .................. 264/DIG. 84 |
| 4,120,626 | 10/1978 | Keller ......................... 264/DIG. 84 |
| 4,150,075 | 4/1979 | Schmitzer et al. ......... 264/DIG. 84 |

FOREIGN PATENT DOCUMENTS

| 58 | 12/1978 | European Pat. Off. .... 264/DIG. 84 |
| 2557572 | 6/1977 | Fed. Rep. of Germany ... 264/DIG. 84 |
| 1301606 | 1/1973 | United Kingdom . |
| 1392859 | 4/1975 | United Kingdom . |
| 1465900 | 3/1977 | United Kingdom . |
| 1487848 | 10/1977 | United Kingdom . |

OTHER PUBLICATIONS

"A New Development Machine for the Continuous Lamination of Rigid Urethane Foam" in *Rubber and Plastics Age*, Jan. 1966, pp. 57–59.

*Primary Examiner*—Philip Anderson
*Attorney, Agent, or Firm*—Cushman, Darby & Cushman

[57] ABSTRACT

A plastic foam-forming mixture (20) is dispensed between upper and lower paper sheets (11 and 17) and the whole conveyed through metering rollers (14 and 15) to spread the mixture. The mixture is allowed to expand under a constant pressure supplied by a floating drag platen (21). Suction is applied to the upper sheet through apertures in the platen. Suitably the platen consists of a series of rigid slats (22) hinged lengthwise transversely to the direction of the sheets, imparting longitudinal flexibility to the platen in that direction. Suction may be applied through apertures in the ends of every third or fourth slat. Improves the evenness of foam board.

7 Claims, 4 Drawing Figures

FOAM BOARD HAVING IMPROVED EVENNESS AND THE METHOD AND APPARATUS FOR ITS CONTINUOUS MANUFACTURE

This invention relates to the continuous manufacture of foam board of the type having a core of plastics foam, especially polyurethane or polyisocyanurate foam, sandwiched between two flexible facing sheets.

Machines suitable for the continuous manufacture of such boards are well known. Generally they consist of a conveyor system for transporting two continuous webs of sheet material fed from supply rolls through a series of operating stations to a point of delivery of a finished foam board, and a foam dispensing unit for applying a self-foaming plastics mixture to one or both facing sheets, normally the lower sheet. If the foam is deposited from a static dispenser a metering device comprising, for example, two closely spaced parallel rollers, is usually provided to cause the facing sheets to converge into proximate relationship with the foam mix sandwiched between them, the mix being distributed across the width of the sheets as the sheets converge and pass through the nip of the metering device. An expansion zone follows in which the foam is allowed to rise, usually under the accelerating influence of heat and usually under light pressure exerted on the upper sheet to prevent delamination caused by gas generated during foaming. After foaming is substantially complete the laminate is transported through a longitudinal gap formed between two spaced, parallel conveyors backed by platens where the foam is cured. On emerging from the gap the side edges of the laminate are trimmed and the laminate is cut into desired lengths.

Various modifications and auxiliary devices have been proposed and used over the years to improve the quality of the product and speed production.

The present invention is concerned with improving the evenness of the foam board by a modification in the expansion zone.

According to the present invention we provide an apparatus for the continuous manufacture of foam board having a plastics foam core sandwiched between flexible facing sheets which comprises a conveyor assembly for continuously advancing upper and lower facing sheets in spaced opposed transversely parallel disposition; a foam dispenser for depositing a liquid mixture of plastics foam-forming ingredients onto at least one of the facing sheets; a metering device for causing the facing sheets to converge into proximate relationship; and zones for the expansion and curing of the foam laminate; there being provided in the expansion zone a longitudinally flexible and laterally rigid floating drag platen which can rest on the upper facing sheet, said platen having a plurality of apertures through which suction can be applied to the upper sheet by a source of reduced pressure in communication with said apertures.

Conveniently the floating drag platen comprises a series of rigid slats hinged lengthwise transversely to the direction of conveyor travel. Aluminium extrusions of the type used in roller shutter blinds make suitable slats. These are about 5 cm wide and have integral hinges. A raised hooked edge on one slat forms a hinge with a complementary section on an adjacent slat. This gives the floating platen longitudinal flexibility.

Preferably the floating platen extends over the full length of the expansion zone. The platen is suitably fixed only at the upstream end with respect to the direction of conveyor travel so that it can drape over and rest on the upper facing sheet during rise of the foaming mixture. For polyurethane foams laminates we have found that satisfactory results are obtained if suction is applied from where there is a perceptible foam rise to where the foam is fully risen; this may be over a distance half the length of the expansion zone. Thus the upper facing sheet is pulled against the underside of the drag platen during foam rise which helps to achieve a flat laminate surface and more particularly prevents the sheet from drooping minimising "tail-off" of foam thickness at the edges of the final product. Edge trim is therefore reduced.

In one embodiment of the invention the apertures through which suction is applied are sited at the ends of the slats. Every third or fourth slat only may need to be apertured. Suction across the full width of the upper sheet may be required only over a small length where the foam is starting to gel. This can have the useful effect of smoothing surface wrinkles.

The present invention may be used in conjunction with the continuous laminators described in co-pending UK Applications Nos. 7,918,923 and 7,940,419 which correspond with U.S. applications Ser. No. 141,929, filed Apr. 21, 1980 and Ser. No. 141,928, filed Apr. 21, 1980, respectively, a cognated form of these applications having been published under European patent publication No. 0021564A1 (DP Application No. 80301223.6).

In another aspect of the invention we provide a method for the manufacture of foam board consisting of a core of plastics foam, especially polyurethane or polyisocyanurate foam, sandwiched between two flexible facing sheets, the process comprising continuously advancing upper and lower facing sheets in spaced opposed transversely parallel disposition; depositing a liquid mixture of plastics foam-forming ingredients onto at least one of the facing sheets, usually the lower sheet, bringing the sheets into proximate relationship so that both shets contact the foam-forming mixture; constricting the sheets so that the foam mixture is spread across the width of the sheets and fully occupies the space therebetween; exerting a predetermined constant pressure on and simultaneously applying suction to the upper facing sheet during expansion of the foam-forming mixture; and thereafter allowing the foam to cure.

The invention also includes the foam boards so produced.

The foam boards of most interest to us have a rigid plastics foam core which may be formed from any suitable plastics foam-forming composition. The invention may, however, have application to flexible foams. Of especial interest are foam cores consisting of an isocyanate-based foam material. Suitable isocyanate-based foams include polyurethane foams obtained in known manner from a suitable mixture of polyurethane-forming ingredients such as polyesters or polyethers and polyisocyanates with water, catalysts, surfactants, blowing agents and other ingredients. Suitable isocyanate-based foams also include polymeric foams containing an isocyanurate ring structure which may be obtained by treating an organic polyisocyanate with an isocyanate-polymerising catalyst, a blowing agent, and optionally, a deficiency, based on the isocyanate groups present, of an active hydrogen-containing compound. These foams and their method of preparation are well documented in the literature and are well known to the skilled worker in this field. The facing materials may be composed of continuous or semi-continuous lengths of any suitable material such as paper, plastics, metal, rubber or paperboard.

By way of illustration only a preferred embodiment of the apparatus of this invention, will now be described with reference to the accompanying drawings in which.

Figure 3:
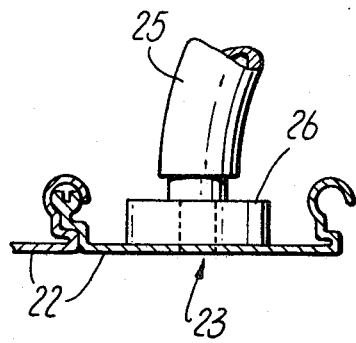
FIG. 3 is a side elevational view of a part of the floating drag platen shown in FIG. 2.

In the drawings an upper paper web 11 fed from a first spool (not shown) passes round an in-feed roller 12 and through a metering gap 13, formed between two steel rollers 14 and 15, before being transported through an expansion zone 16 and curing zone (not shown). The expansion zone is about 8 m long. A lower paper web 17 fed from a second spool (not shown) passes round an in-feed roller 18 and through the metering gap 13 before being transported with and in like manner to the upper web 11. Three static combined mixing heads and dispensers (only one of which, 19, is shown for simplicity) are positioned symetrically across the width of the lower part web and are connected to supplies of rigid polyurethane foam-forming ingredients 20. A floating drag platen 21, fixed only at its upstream end with respect to the direction of conveyor travel rests on the upper web 11. The platen comprises a series of 5 cm wide hinged extruded aluminium slats 22 and extends the length of the expansion zone. For a distance of about 6 m starting 1½ m. from the upstream end of the platen, every third slat has an aperture 23 at each end. Stationed above each side of the platen, a manifold 24 is connected to a source of reduced pressure (not shown) and, via flexible hoses 25, to apertured blocks (of which only one 26 is shown in FIG. 3) bonded to every third slat in register with one of the apertures in the slat. In FIG. 3 the positions of the apertures in the block 26 and slat 22 are shown in broken lines.

In this way, suction is applied from where there is a perceptible foam rise (1½ m from the metering gap 13) to where the foam is fully risen (6 m downstream of the point of perceptible foam rise).

We have found that suction applied through apertures in the ends of every third or fourth slat is sufficient to hold the edges of a relatively heavy (300 g/m$^2$) upper paper web provided the foam core extends close to the apertures. This is using a fan to generate a maximum pressure of 70 cm water at zero flow and about 19 m$^3$/min air flow at zero pressure. High available flow rate is important in order to suck the paper web back against the slats in the event of disruption during lamination and at start-up. It also is necessary to allow for the inevitable leaks which occur in the system.

Figure 4:
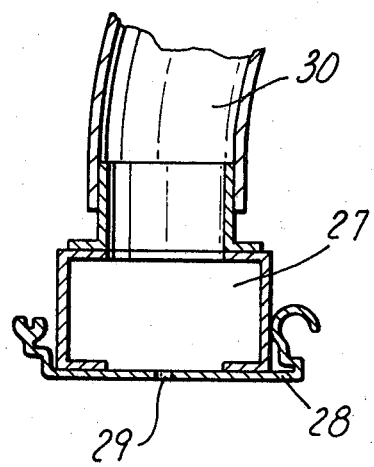
FIG. 4 is a cross section of a part of an alternative floating drag platen.

It will be apparent to those skilled in the art that the number of apertures can be varied to suit the source of reduced pressure used. Further, suction can be applied across the width of one or more slats through slits or series of apertures in the slats. Such an alternative is illustrated in FIG. 4 in which a chamber 27 is bonded to and extends across the width of a slat 28 which has a series of apertures 29. A flexible hose 30 connects the chamber 27 to a source of reduced pressure (not shown). Application of suction across the full width of slats has the effect of smoothing surface wrinkles.

Figure 1:
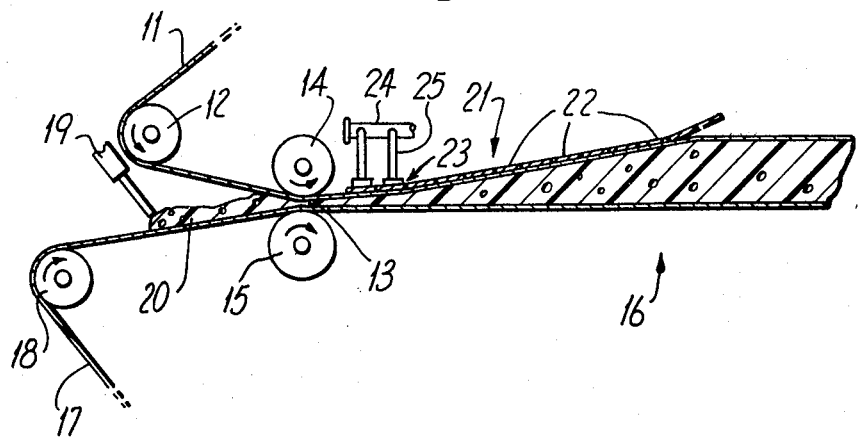
FIG. 1 is a diagrammatic, side elevational view of part of a foam board production machine incorporating the invention.
Figure 2:
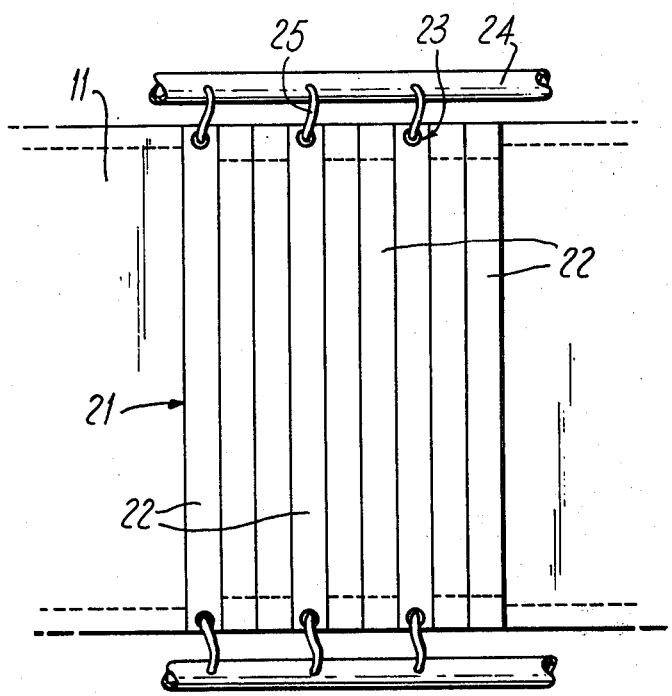
FIG. 2 is a diagrammatic plan view of part of the same machine illustrated in FIG. 1 showing a floating drag platen.

Since, in the embodiment described, the slats can slide relatively to each other on their hinges, the platen can be modified to suit particular product needs. For example, when abrasive facings or contaminated facings, such as bituminised facings, are used, the apertured slats can be longer than the others. This allows the shorter slats to be protected by a film laid on the abrasive or contaminated facing. Any abrasion or contamination is thus limited to the unprotected ends of the apertured slats. A convenient length of shorter slats is indicated by short broken lines in FIG. 2. The long broken lines in FIG. 2 indicate where the laminate is trimmed at its edges. It will be seen, in this case, that suction is applied to the edges of the upper facing sheet to be trimmed.

Desirably suction is applied across the full width of the floating drag platen over a small part of its length where the foam is starting to gel. Ideally this is above a lower fixed heated platen over which the lower facing passes. This lower platen may be foraminated so that suction can be applied to the lower facing. Both facings will then be kept smooth simultaneously.

The pressure applied by the floating drag platen may be adjusted by placing dead weights on the slats. Suitable weights are mild steel bars having a cross section measuring 3.8 cm by 0.6 cm. For a polyurethane foam, the optimum dead weight loading has been found to be 65 to 130 kg/m$^2$ on a floating drag platen constructed from a roller shutter blind made from 5 cm wide aluminium extrusions.

Other features of the apparatus may be those conventionally used on machines for the continuous manufacture of foam boards. Thus, for example, the laminating machine described in the article entitled "A New Development Machine for the Continuous Lamination of Rigid Urethane Foam" published in Rubber and Plastic Age, Volume 47 (1966), No. 1, page 57 may be modified to incorporate the metering device of the present invention which will normally be used in conjunction with one or more symetrically located static dispensers replacing the more cumbersome and, in many ways, the operationally and environmentally less attractive reciprocating spray head.

The favoured curing zone is described in more detail in British Pat. No. 1,075,401 in which a "floating-platen" exerts a predetermined constant pressure on the foam core during the curing period.

We claim:

1. A method for the manufacture of foam board consisting of a core of plastics foam, especially polyurethane or polyisocyanurate foam, sandwiched between two flexible facing sheets, the process comprising continuously advancing upper and lower facing sheets in spaced opposed transversely parallel disposition; depositing a liquid mixture of plastics foam-forming ingredients onto at least one of the facing sheets, usually the lower sheet, bringing the sheets into proximate relationship so that both sheets contact the foam-forming mixture; constricting the sheets so that the foam mixture is spread across the width of the sheets and fully occupies the space therebetween; exerting a predetermined constant pressure on and simultaneously applying suction to the upper facing sheet during expansion of the foam-forming mixture; and thereafter allowing the foam to cure.

2. Foam boards having improved evenness produced the apparatus according to by the method to claim 1.

3. Apparatus for the continuous manufacture of foam board having a plastics foam core sandwiched between flexible facing sheets which comprises a conveyor assembly for continuously advancing upper and lower facing sheets in spaced opposed transversely parallel disposition; a foam dispenser for depositing a liquid mixture of plastics foam-forming ingredients onto at least one of the facing sheets; a metering device for causing the facing sheets to converge into proximate relationship; and zones for the expansion and curing of the foam laminate; there being provided in the expansion zone a longitudinally flexible and laterally rigid floating drag platen which can rest on the upper facing sheet, said platen having a plurality of apertures through which suction can be applied to the upper sheet by a source of reduced pressure in communication with said apertures.

4. Apparatus according to claim 3 in which the platen comprises a series of rigid slats hinged lengthwise transversely to the direction of conveyor travel.

5. Apparatus according to claim 3 in which the platen extends over the full length of the expansion zone.

6. Apparatus according to claim 3 in which the platen is fixed only at the upstream end with respect to the direction of conveyor travel so that it can drape over the rest of the upper facing sheet during rise of the foaming mixture.

7. Apparatus according to claim 4 in which the apertures through which suction is applied are sited at the ends of the slats.

* * * * *